(12) United States Patent
Sun et al.

(10) Patent No.: US 7,623,467 B1
(45) Date of Patent: Nov. 24, 2009

(54) WIRELESS CHANNEL ESTIMATION

(75) Inventors: Qinfang Sun, Cupertino, CA (US);
Won-Joon Choi, Sunnyvale, CA (US);
Jeffrey M. Gilbert, Sunnyvale, CA (US); Yi-Hsiu Wang, Palo Alto, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1027 days.

(21) Appl. No.: 10/666,953

(22) Filed: Sep. 17, 2003

(51) Int. Cl.
*H04L 12/28* (2006.01)

(52) U.S. Cl. .................. 370/252; 370/310; 370/431; 370/492; 375/147

(58) Field of Classification Search .............. 370/492
See application file for complete search history.

(56) References Cited

U.S. PATENT DOCUMENTS

| | | | | |
|---|---|---|---|---|
| 5,214,687 A * | 5/1993 | Kansakoski et al. | ......... | 455/425 |
| 5,621,723 A * | 4/1997 | Walton et al. | ............. | 370/335 |
| 6,515,978 B1 * | 2/2003 | Buehrer et al. | ............. | 370/342 |
| 6,654,363 B1 * | 11/2003 | Li et al. | ....................... | 370/338 |
| 6,674,817 B1 * | 1/2004 | Dolle et al. | .................. | 375/342 |
| 6,707,856 B1 * | 3/2004 | Gardner et al. | .............. | 375/260 |
| 6,930,989 B1 * | 8/2005 | Jones, IV et al. | ............ | 370/335 |
| 7,173,972 B2 * | 2/2007 | Thomson et al. | ............ | 375/260 |
| 2003/0112743 A1 * | 6/2003 | You et al. | .................... | 370/203 |
| 2003/0165185 A1 * | 9/2003 | Arima et al. | ................. | 375/147 |
| 2004/0004935 A1 * | 1/2004 | Zhu et al. | .................... | 370/208 |
| 2004/0005010 A1 * | 1/2004 | He et al. | ...................... | 375/260 |
| 2004/0047410 A1 * | 3/2004 | Choi et al. | .................. | 375/232 |
| 2004/0062215 A1 * | 4/2004 | Sato | ........................... | 370/320 |

FOREIGN PATENT DOCUMENTS

EP          1193934       *   4/2002

* cited by examiner

*Primary Examiner*—Chi H. Pham
*Assistant Examiner*—Shick Hom
(74) *Attorney, Agent, or Firm*—Van Pelt, Yi & James LLP (57) ABSTRACT

A system and method are disclosed for wireless channel estimation. Estimating the characteristics of a wireless channel includes receiving a plurality of training symbols sent for the purpose of facilitating channel estimation; calculating a phase difference between at least two of the training symbols; using the calculated phase difference to coherently combine the training symbols to produce a composite training symbol; and using the composite training symbol to estimate the channel.

30 Claims, 5 Drawing Sheets

+ + + + + + + -  Invert Last Symbol

- + + + + + + +  Invert First Symbol or
- - + + + + + +  First and Second Symbol

- + + + + + + +  Selectively Invert First Symbol
+ + + + + + + +

WIRELESS CHANNEL ESTIMATION

FIELD OF THE INVENTION

The present invention relates generally to channel estimation. More specifically, processing a sequence of symbols to reliably estimate a wireless channel is disclosed.

BACKGROUND OF THE INVENTION

The IEEE 802.11a, 802.11b, and 802.11g standards, which are hereby incorporated by reference, specify wireless communications systems in bands at 2.4 GHz and 5 GHz. The 802.11a standard will be referred to repeatedly herein for the purpose of example. It should be noted that the techniques described are also applicable to the 802.11g standard and to the 802.11b standard where appropriate. It would be useful if alternate systems could be developed for communication over an extended range or in noisy environments. Such communication is collectively referred to herein as extended range communication.

Channel estimation and fine frequency offset calculation are more difficult for extended range communication or communication over any other channel with low SNR. The IEEE 802.11a standard specifies a packet channel estimation preamble that includes two identical special OFDM symbols that are used for fine frequency offset calculation and channel estimation. An augmented packet preamble design and techniques for processing the augmented preamble are needed for extended range communication.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

To provide extended range, a preamble that includes a sequence of more than two training symbols is sent and received for the purpose of channel estimation. For the purpose of this specification, extended range refers to any channel having lower SNR than is specified in the IEEE standards as, for example, if a low power transmitter were used. In one embodiment, the training symbols are identical special OFDM symbols similar to the long symbols used in the IEEE 802.11a standard which are each 3.2 μsec long. In some embodiments, the training symbols are the same as the long symbols used in the IEEE 802.11a standard. In systems with different extended range modes, different modes may use different numbers of long symbols in the preamble depending on the data rate of the mode. The polarity of one or more selected long symbols is inverted to indicate the number of long symbols in the preamble. The number of long symbols in the preamble indicates the data rate of a signal field of the packet. Detection of the polarity inversion is also used as a check to avoid false detection of a packet. The phase change between the successive long symbols is calculated and used to coherently add the long symbols and to calculate the fine frequency offset.

Figure 1:
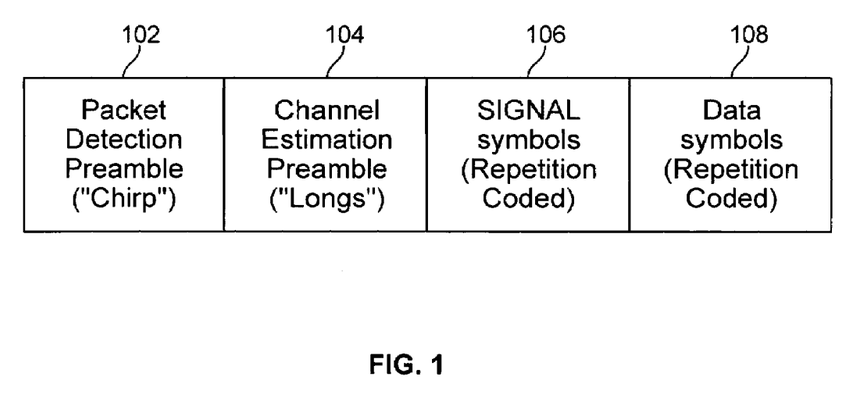
FIG. 1 is a diagram illustrating a packet format used for an extended range mode.

FIG. 1 is a diagram illustrating a packet format used for an extended range mode. The packet includes a packet detection preamble 102, a channel estimation preamble 104, a signal field 106, and a data field 108. A series of "medium" symbols are included in the packet detection preamble to enable packet detection, coarse frequency offset calculation and synchronization. The medium symbols are longer than the 802.11a/g short training symbols, but shorter than the long training symbols. The long symbols are included in the channel estimation preamble for channel estimation and fine frequency offset calculation. The signal field includes information about the packet and the data field includes the data payload of the packet.

Adding the two long symbols sent in the IEEE 802.11a channel estimation packet preamble does not provide enough gain in low SNR environments for sufficiently accurate channel estimation. Sending more than two long symbols enables the receiver to combine the additional long symbols to increase the gain and estimate the channel. However, sending a longer training sequence adds overhead and decreases efficiency. In one embodiment, either 8 or 16 long symbols are included in the channel estimation preamble, depending on the data rate that is being used.

The two received long symbols in the IEEE 802.11a packet may simply be added. Combining a larger number of long symbols when there is a frequency offset is problematic because the phase difference between the earlier sent long symbols that are sent and the later sent long symbols can be significant. The average phase difference is estimated using earlier sent long symbols and the phase difference of the later sent long symbols is corrected using the average estimated phase difference so that they are coherently added to the earlier long symbols. For the purpose of this description and the claims, "coherently" combining should not be interpreted to mean that the long symbols are perfectly coherently combined, but only that some phase correction for some of the long symbols is computed for the purpose of making the combination of all the long symbols at least somewhat more coherent. The phase difference is estimated by computing the cross correlation of each received long symbol with the known long symbol and then computing the self correlation between the cross correlation values of each two neighboring long symbols.

In one embodiment, storing of the long symbols until a final phase estimate is calculated is avoided by applying the best current estimate of the phase correction to each long symbol as it is received and added to the other long symbols. Thus, the first two long symbols are added together and their phase difference is calculated and used to correct the phase of the third long symbol when it is received. In some embodiments, the first two long symbols may be discarded while in other embodiments, they may be used along with the subsequent long symbols to estimate the channel. The phase difference between the third long symbol and the second long symbol is likewise calculated and the average of the two calculated phase differences is used to correct the phase of the fourth long symbol when it is received. Thus, there is no phase correction for the second long symbol, but that is not problematic since the second long symbol is sent just after the first long symbol and the phase error is small. As the phase error increases for subsequent long symbols, the phase correction gets more accurate as more phase differences are calculated and averaged. No buffering or storing of the long symbols is required since the available phase correction at the time the long symbol is received is used so that the long symbol is combined with the other long symbols without delay. The final average phase difference between long symbols after all the long symbols are received is used to calculate the fine frequency offset.

Figure 2:
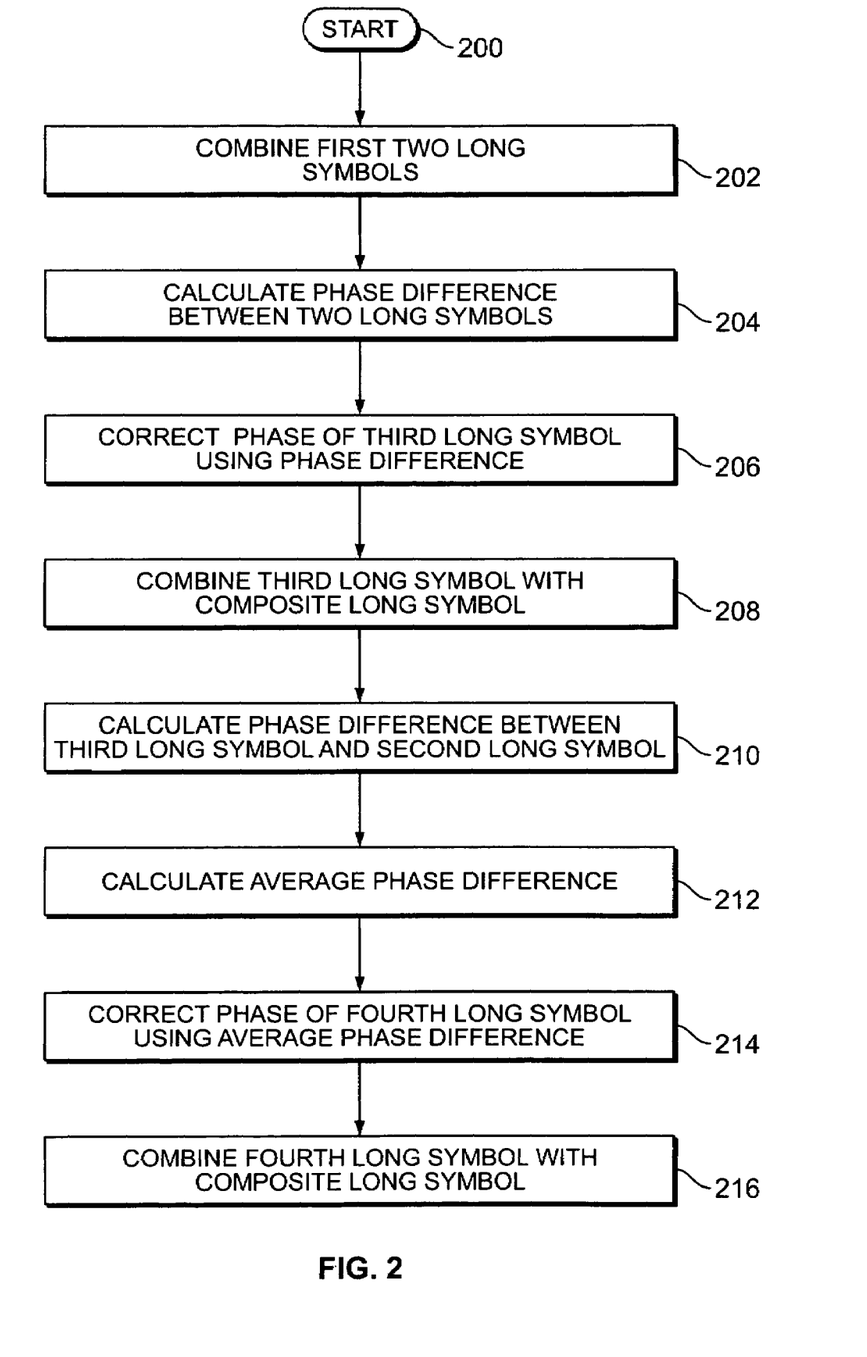
FIG. 2 is a flowchart illustrating the process for coherently combining the long symbols.

FIG. 2 is a flowchart illustrating the process for coherently combining the long symbols. The process starts at 200. In a step 202, the first two long symbols are combined. Next, in a step 204, the phase difference between the first two long symbols is calculated. In step 206, the phase of the third long symbol is corrected using the phase difference calculated in step 204. After the phase of third long symbol is corrected, the third long symbol is combined with the composite long symbol in steps 208. The composite long symbol is the best estimate of the long symbol formed by combining each received long symbol coherently. In step 210, the phase difference between the third long symbol and the second long symbol is calculated and the average phase difference between each of the long symbols is calculated in step 212. The average phase difference is used to correct the phase of the fourth long symbol in step 214. The fourth long symbol is combined with the composite long symbol in step 216. The process continues in a similar manner for however many long symbols are being sent. It should be noted that, for the purpose of example, the steps illustrated in FIG. 2 are shown as occurring sequentially. In various implementations, steps such as calculating the phase differences between training symbols and combining training symbols may be executed in parallel.

A plurality of extended range modes are provided at different data rates depending on the SNR of the available channel. In one embodiment, five extended range modes are defined at data rates of 3 Mbps, 2 Mbps, 1 Mbps, 0.5 Mbps, and 0.25 Mbps, respectively. More long symbols are provided in the channel estimation preamble for the lower data rates which are used for channels with lower SNR. Fewer long symbols are used for the higher data rates for higher SNR channels to reduce overhead where the additional long symbols are not required. For example, 8 long symbols are provided for the three fastest data rate modes (3 Mbps, 2 Mbps, or 1 Mbps) and 16 long symbols are provided for the slower data rate modes 0.5 Mbps or 0.25 Mbps) in one embodiment. The situation is different than the IEEE 802.11a standard where the number of long symbols in the channel estimation preamble is fixed. To enable the channel estimation to be processed at the end of the long symbols so that the channel estimate can immediately be used to process the signal field, the number of long symbols in the channel estimation preamble is indicated by inverting the sign of one or more selected long symbols, as described below.

In various embodiments, a different number of long symbols may be provided for every data rate. The example shown above represents a trade off between complexity and efficiency. In general, determining the number of long symbols included in the packet is referred to as packet classification. In the example given above, the packet is classified as either a faster data rate extended range mode packet (8 long symbols in the channel estimation preamble) or a slower data rate extended range mode packet (16 long symbols in the channel estimation preamble).

Immediately after the channel estimation preamble, the signal field is received. Since specifying the data rate of the signal field would require additional overhead, the packet classification is also used to determine the data rate of the signal field without further encoding. The signal field for each of the faster data rate extended range mode packets uses the slowest data rate in that class, (1 Mbps in the embodiment described above). Likewise, the signal field for the slower data rate extended range mode packets uses the slowest data rate in that class, (0.25 Mbps). The signal field itself further specifies the actual specific data rate and that rate is used in the data field.

Figure 3:
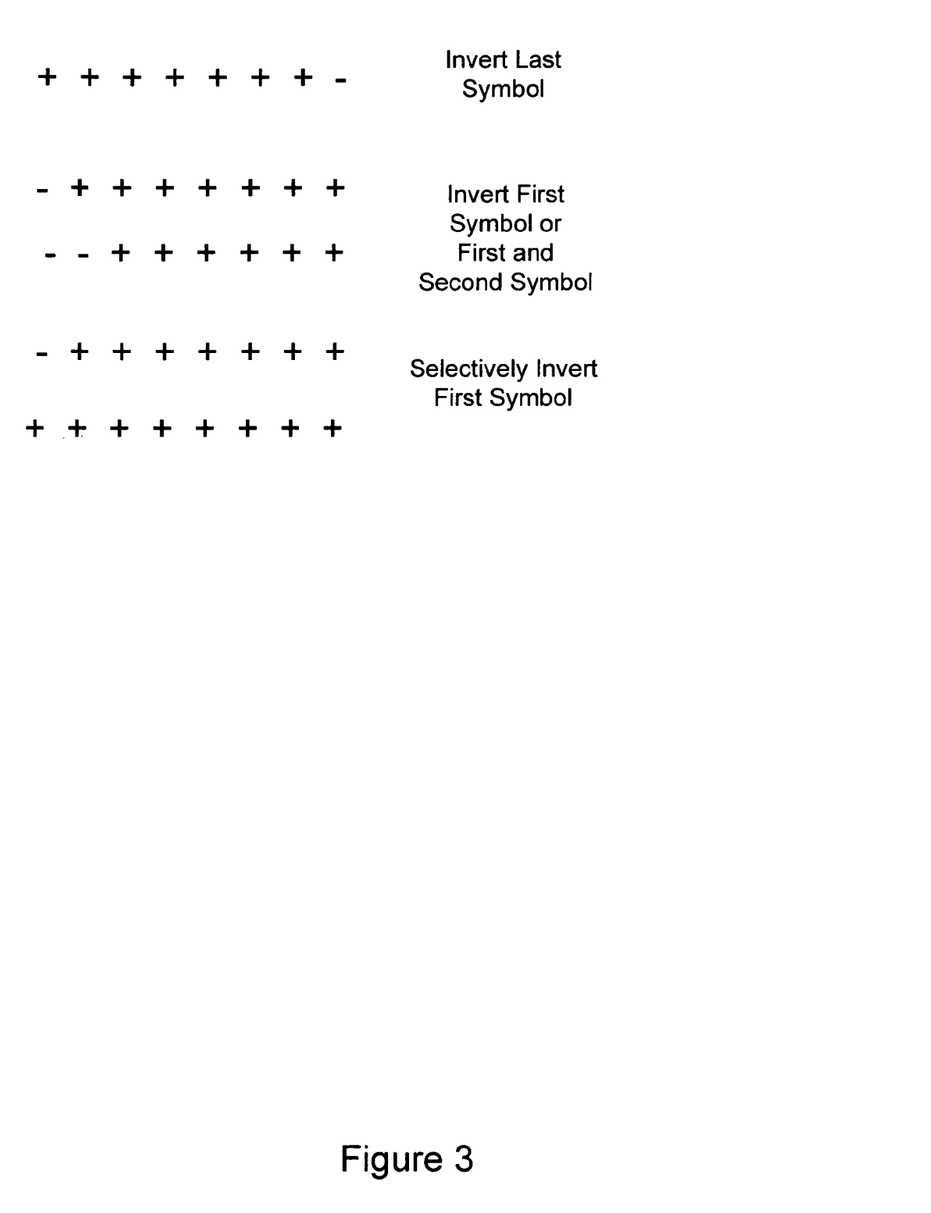
FIG. 3 is a diagram illustrating alternative signaling schemes used to indicate the number of long symbols and classify a packet.

FIG. 3 is a diagram illustrating alternative signaling schemes used to indicate the number of long symbols and classify a packet. A first scheme inverts the last symbol in the long symbols to indicate the long symbols have ended. The phase transition caused by the inverted symbol is detected by the self correlation calculated in the manner described above in connection with determining the phase difference between successive received long symbols for the purpose of coherently adding the long symbols. In various embodiments, coherently adding the long symbols and signaling by inverting symbols may be used together or separately. When the transition is detected, the sign of the symbol is corrected.

The advantage of the first scheme is flexibility, since it does not require a predetermined mapping table. The drawback is that since the transition is at the end of the long symbols, there is little time left for correcting the sign and finishing the fine frequency offset and channel estimation before the signal field symbols arrive. An additional buffer may be required to keep the first signal field symbol before it can be processed, and delay is added.

A second scheme inverts the first symbol to indicate one number of long symbols and inverts the first two symbols to indicate an alternate number of long symbols. The occurrence of the phase transition after the first or second symbol indicates the number of long symbols. This scheme requires a predetermined arbitrary assignment of number of long symbols to the alternative inversion patterns, but allows more time for correcting the sign and makes the number of long symbols known much earlier. Thus, the scheme trades flexibility for processing. This scheme also has the added advantage that the required early phase transition can be used as a check for false packet detection. If the transition is not detected after the first or second symbol, then the packet is dropped.

A third scheme selectively inverts or does not invert the first symbol and so requires only one or zero sign corrections. However, it does not always provide a phase transition so the extra check for false packet detection is not provided.

In other embodiments, other signaling schemes based on different transitions are used. In some embodiments, more than two possible numbers of long symbols are included in the channel estimation preamble. Whatever scheme is used, the polarity change is corrected either by changing the polarity of the composite long symbol or individual long symbols, as appropriate. In some embodiments, the phase shifted symbols are simply discarded and only the remaining unshifted symbols are used to calculate the composite long symbol.

Figure 4:
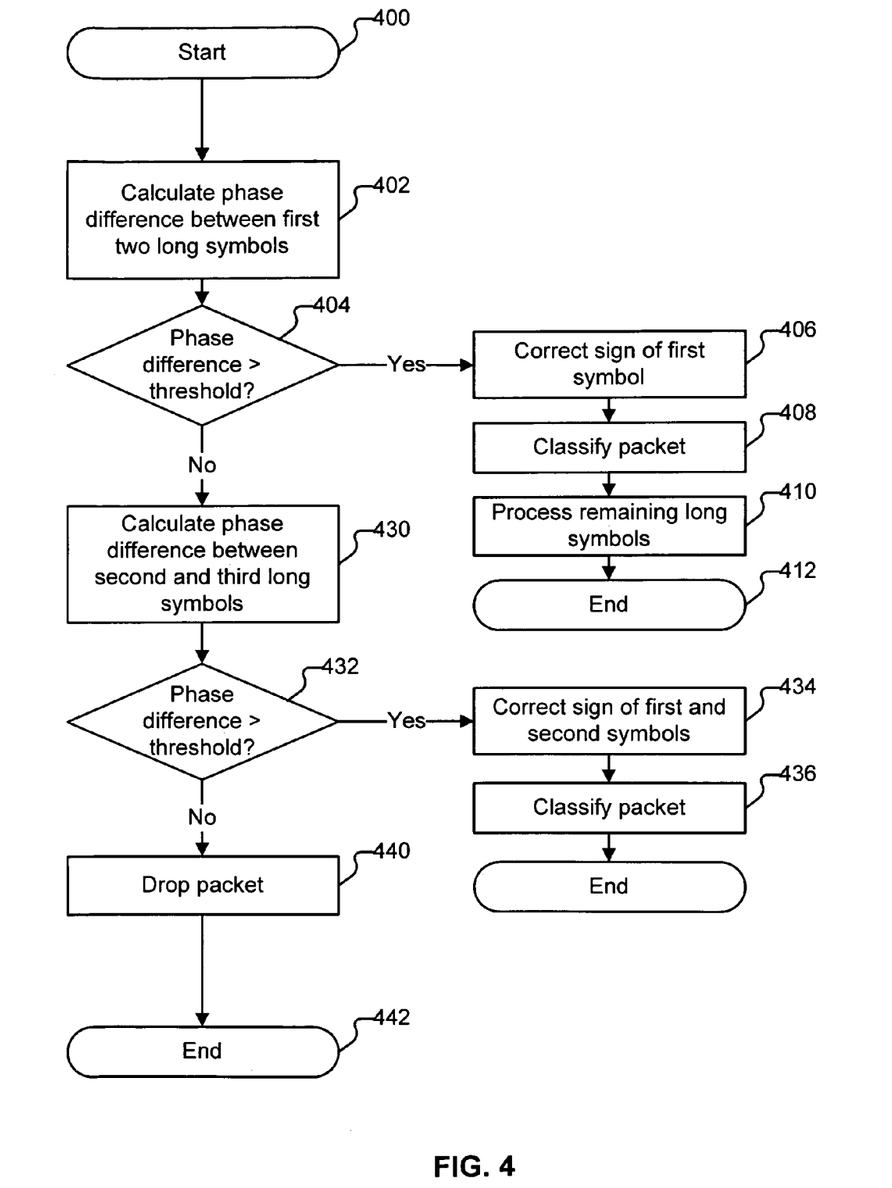
FIG. 4 is a flow chart illustrating a process for packet classification using the second scheme described above in connection with FIG. 3.

FIG. 4 is a flow chart illustrating a process for packet classification using the second scheme described above in connection with FIG. 3. The process starts at 400. In step 402, the phase difference between the first two received long symbols is calculated. Next, it is determined in step 404 whether the phase difference is greater than a threshold. The threshold is set at an appropriate level to reliably detect without false detection the 180 degree phase shift resulting from the polarity of the long symbol that was sent being reversed. If the phase difference is greater than the threshold, then control is transferred to step 406 and the sign of the first symbol received is corrected. The packet is classified in step 408 and the remaining long symbols are processed in step 410 until the process ends at 412.

If the phase difference is determined to be less than the threshold in step 404, then control is transferred to step 430 where the phase difference between the second and third long symbols is calculated after the third long symbol has been received. Then, in step 432 it is determined whether that phase difference is greater than the threshold. If the phase difference is greater than the threshold, then control is transferred to step 434 where the sign of the first and second symbols is corrected. In some embodiments the sign of the first and second symbols is corrected by correcting the sign of the composite symbol by combining the first and second symbols. The packet is then classified in step 436 and the remaining long symbols are processed in step 410 until the process ends at 412.

If, in step 432, the phase difference is not greater than the threshold, then control is transferred to step 440 and the packet is dropped. The packet is dropped because, according to the second scheme shown in FIG. 3, a 180 degree phase shift is expected either after the first symbol or after the second symbol. The failure to detect such a phase shift is used to indicate that a packet has incorrectly been detected. The process then ends at 442.

Figure 5:
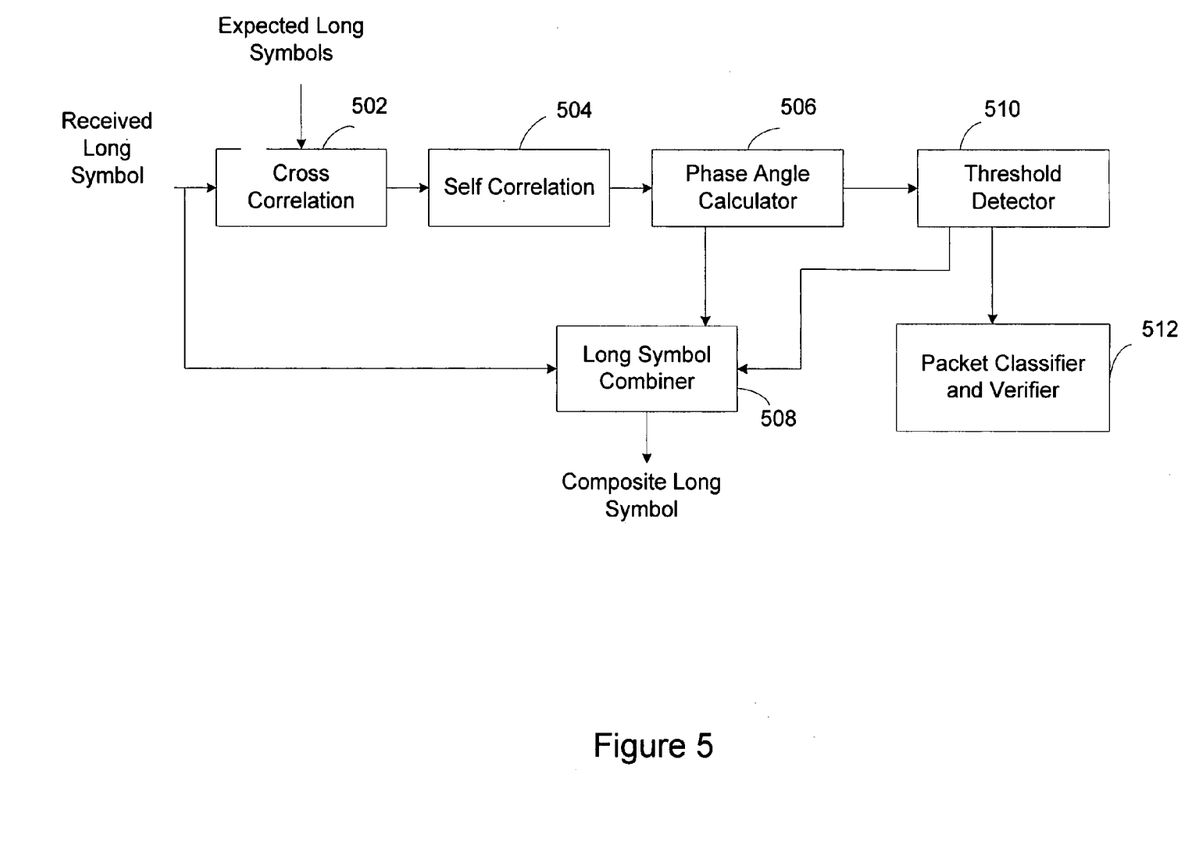
FIG. 5 is a diagram illustrating an exemplary system for processing the long symbols.

In other embodiments, the phase difference between two training symbols need not be calculated for the purpose of determining the type of packet. For example, the angle of the self correlation of two training symbols can be compared or the sign of the real part of the conjugate multiple of two training symbols may be used to detect a phase transition. Generally, the self correlation is equivalent to the conjugate multiple product and self correlation may be used for the conjugate multiple FIG. 5 is a diagram illustrating an exemplary system for processing the long symbols. The received long symbol is input to cross correlation block 502 along with the expected long symbol which is known a priori. The cross correlation of the expected long symbol with the received long symbol is sent to self correlation block 504 and long symbol combiner 508.

Self correlation block 504 computes the self correlation of successive cross correlations. The real and imaginary part of the self correlation is input to phase angle calculator 506 which determines the phase difference between successively received long symbols. The output of phase angle calculator 506 is sent to long symbol combiner 508 and threshold detector 510. The output of threshold detector 510 is sent to long symbol combiner 508 and packet classifier and verifier 512.

Packet classifier and verifier 512 classifies the packet as the faster extended range packet or a slower extended range packet based on the timing of when the threshold detector calculates the change in polarity of a long symbol. The packet is verified by the existence of the polarity change at a valid point.

Long symbol combiner 508 generates a composite long symbol by coherently combining each received long symbol using information from phase angle calculator 506. In addition, long symbol combiner switches the polarity of the composite long symbol or a received individual symbol as appropriate based on information received from threshold detector 510. It should be noted that the blocks and connections shown in this diagram vary in different embodiments with various blocks being combined into single blocks or split into individual blocks as appropriate.

Computing a composite long symbol from a plurality of long symbols by coherently combining the long symbols has been described. Once the composite received long symbol is computed, it can be used for channel estimation using standard techniques. Different extended range modes are provided at different data rates. More long symbols are used for lower data rate modes than for higher data rate modes where the SNR is better. The number of long symbols is determined using a signaling scheme and the number of long symbols determines a data rate used in a signal field that further specifies a data rate for the rest of the packet.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of estimating the characteristics of a wireless channel comprising:
   receiving a plurality of training symbols sent for the purpose of facilitating channel estimation;
   calculating, using a processor, a phase difference between at least two of the training symbols;
   using the calculated phase difference to coherently combine the training symbols to produce a composite training symbol; and
   using the composite training symbol to estimate the channel;
   wherein the phase difference is calculated by computing the cross correlation of each of the at least two training symbols with a known training symbol and computing the self correlation of each of the cross correlations.

2. The method as recited in claim 1 wherein the plurality of training symbols includes more than two training symbols.

3. The method as recited in claim 1 wherein the calculated phase difference is used for fine frequency offset determination.

4. The method as recited in claim 1 wherein the training symbols are the long symbols defined in the IEEE 802.11a standard.

5. The method as recited in claim 1 wherein a plurality of phase differences are calculated and the average of the phase differences is used for fine frequency offset determination.

6. A method of classifying a packet sent over a wireless channel comprising:
   receiving a plurality of training symbols sent for the purpose of facilitating channel estimation;
   detecting a phase transition between at least two of the training symbols; and
   classifying, using a processor, the packet based on the detected phase transition;
   wherein the classification determines a data rate of a first field included in the packet, wherein the first field contains information about the data rate of a second field in the packet.

7. The method as recited in claim 6 wherein detecting the phase transition between at least two of the training symbols includes calculating a phase difference between at least two of the training symbols and comparing the calculated phase difference to a threshold.

8. The method as recited in claim 6 wherein detecting the phase transition between at least two of the training symbols includes conjugate multiplying the training symbols and determining the sign of the real part of the result of the conjugate multiplying.

9. The method as recited in claim 6 wherein detecting the phase transition between at least two of the training symbols includes computing the angle of the self correlation of the training symbols.

10. The method of classifying a packet sent over a wireless channel as recited in claim 6 wherein the classification determines the number of training symbols expected.

11. The method as recited in claim 6 wherein the phase difference is caused by inverting the sign of a selected training symbol.

12. The method as recited in claim 6 wherein the phase difference is caused by inverting the sign of a selected training symbol and the classification is based on which training symbol was selected to be inverted.

13. The method as recited in claim 6 wherein the result of comparing the calculated phase difference to a threshold is used as a confirmation that the packet is a valid packet.

14. The method as recited in claim 6 wherein the result of comparing the calculated phase difference to a threshold is used to selectively change the polarity one or more received training symbols.

15. The method as recited in claim 6 wherein the result of comparing the calculated phase difference to a threshold is used to selectively switch the polarity one or more received training symbols and wherein the calculated phase difference used to coherently combine the training symbols.

16. A system for estimating the characteristics of a wireless channel comprising:
   a receiver configured to receive a plurality of training symbols sent for the purpose of facilitating channel estimation;
   a processor configured to:
   calculate a phase difference between at least two of the training symbols;
   use the calculated phase difference to coherently combine the training symbols to produce a composite training symbol; and
   use the composite training symbol to estimate the channel;
   wherein the phase difference is calculated by computing the cross correlation of each of the at least two training symbols with a known training symbol and computing the self correlation of each of the cross correlations.

17. A computer program product for estimating the characteristics of a wireless channel, the computer program product being embodied in a computer readable storage medium having a stored computer program comprising computer instructions for:
   receiving a plurality of training symbols sent for the purpose of facilitating channel estimation;
   calculating a phase difference between at least two of the training symbols;
   using the calculated phase difference to coherently combine the training symbols to produce a composite training symbol; and
   using the composite training symbol to estimate the channel;
   wherein the phase difference is calculated by computing the cross correlation of each of the at least two training symbols with a known training symbol and computing the self correlation of each of the cross correlations.

18. A method of classifying a packet sent over a wireless channel comprising:
   receiving a plurality of training symbols sent for the purpose of facilitating channel estimation;
   detecting a phase transition between at least two of the training symbols; and
   classifying, using a processor, the packet based on the detected phase transition;
   wherein the classification determines the data rate of a first field included in the packet, wherein the first field contains information about the data rate of a second field in the packet.

19. The method as recited in claim 18 wherein detecting the phase transition between at least two of the training symbols includes calculating a phase difference between at least two of the training symbols and comparing the calculated phase difference to a threshold.

20. The method as recited in claim 18 wherein detecting the phase transition between at least two of the training symbols includes conjugate multiplying the training symbols and determining the sign of the real part of the result of the conjugate multiplying.

21. The method as recited in claim 18 wherein detecting the phase transition between at least two of the training symbols includes computing the angle of the self correlation of the training symbols.

22. The method as recited in claim 18 wherein the classification determines the number of training symbols expected.

23. The method as recited in claim 18 wherein the classification determines a data rate for a portion of the packet.

24. The method as recited in claim 18 wherein the phase difference is caused by inverting the sign of a selected training symbol.

25. The method as recited in claim 18 wherein the phase difference is caused by inverting the sign of a selected training symbol and the classification is based on which training symbol was selected to be inverted.

26. The method as recited in claim 18 wherein the result of comparing the calculated phase difference to a threshold is used as a confirmation that the packet is a valid packet.

27. The method as recited in claim 18 wherein the result of comparing the calculated phase difference to a threshold is used to selectively change the polarity one or more received training symbols.

28. The method as recited in claim 18 wherein the result of comparing the calculated phase difference to a threshold is used to selectively switch the polarity one or more received training symbols and wherein the calculated phase difference used to coherently combine the training symbols.

29. A system for classifying a packet sent over a wireless channel comprising:
- a receiver configured to receive a plurality of training symbols sent for the purpose of facilitating channel estimation;
- a processor configured to:
- detect a phase transition between at least two of the training symbols; and
- classify the packet based on the detected phase transition;
- wherein the classification determines the data rate of a first field included in the packet, wherein the first field contains information about the data rate of a second field in the packet.

30. A computer program product for classifying a packet sent over a wireless channel, the computer program product being embodied in a computer readable storage medium having a stored computer program comprising computer instructions for:
- receiving a plurality of training symbols sent for the purpose of facilitating channel estimation;
- calculating a phase difference between at least two of the training symbols;
- comparing the calculated phase difference to a threshold; and
- classifying the packet based on the comparison;
- wherein the classification determines the data rate of a first field included in the packet, wherein the first field contains information about the data rate of a second field in the packet.

* * * * *

UNITED STATES PATENT AND TRADEMARK OFFICE
CERTIFICATE OF CORRECTION

PATENT NO. : 7,623,467 B1 Page 1 of 1
APPLICATION NO. : 10/666953
DATED : November 24, 2009
INVENTOR(S) : Sun et al.

It is certified that error appears in the above-identified patent and that said Letters Patent is hereby corrected as shown below:

Column 7, line 45 delete "polarity one or more" and insert -- polarity of one or more --
Column 7, line 49 delete "polarity one or more" and insert -- polarity of one or more --
Column 8, line 61 delete "polarity one or more" and insert -- polarity of one or more --
Column 8, line 65 delete "polarity one or more" and insert -- polarity of one or more --

Signed and Sealed this

Ninth Day of March, 2010

David J. Kappos
*Director of the United States Patent and Trademark Office*